United States Patent
Liu et al.

(10) Patent No.: US 12,131,149 B1
(45) Date of Patent: Oct. 29, 2024

(54) UPDATING METHOD FOR PROGRAMMABLE DATA PLANE AT RUNTIME, AND APPARATUS

(71) Applicant: TSINGHUA UNIVERSITY, Beijing (CN)

(72) Inventors: Bin Liu, Beijing (CN); Yong Feng, Beijing (CN); Zhikang Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/749,646

(22) Filed: Jun. 21, 2024

Related U.S. Application Data

(63) Continuation of application No. PCT/CN2022/134290, filed on Nov. 25, 2022.

(30) Foreign Application Priority Data

Jan. 18, 2022 (CN) .......................... 202210055016.7

(51) Int. Cl.
G06F 8/656 (2018.01)
(52) U.S. Cl.
CPC .................. *G06F 8/656* (2018.02)
(58) Field of Classification Search
CPC ............ G06F 8/656; G06F 8/65; G06F 8/654
See application file for complete search history.

(56) References Cited

U.S. PATENT DOCUMENTS

| 11,005,754 | B1 * | 5/2021 | Baldi | ...................... H04L 45/56 |
| 11,711,453 | B2 * | 7/2023 | Levy | ...................... H04L 69/324 |
| | | | | 709/224 |
| 2020/0053025 | A1 * | 2/2020 | Evans | ...................... H04L 69/22 |

(Continued)

FOREIGN PATENT DOCUMENTS

| CN | 103347013 A | 10/2013 |
| CN | 114416150 A | 4/2022 |
| WO | 2021044191 A1 | 3/2021 |

OTHER PUBLICATIONS

Simon Jouet, BPFabric: Data Plane Programmability for Software Defined Networks, Jul. 3, 2017, IEEE (Year: 2017).*

(Continued)

*Primary Examiner* — Wei Y Zhen
*Assistant Examiner* — Amir Soltanzadeh

(57) ABSTRACT

A method and an apparatus for updating a programmable data plane at runtime are provided. The method includes: splitting, based on distributed on-demand parsers of the data plane, a parsing graph into parsing sub-graphs, and distributing each parsing sub-graph to a respective physical stage in a virtual pipeline of the data plane; adjusting, based on template-based processors and the virtual pipeline, an order between any two template-based processors by configuring an interconnection network; disaggregating and pooling, based on a decoupled resource pool of the data plane, flow table resources of each physical stage, and updating a flow table at runtime; and suspending, based on a fast update controller of the data plane, packet processing prior to a to-be-updated template-based processor, and configuring or deleting the template-based processor from the pipeline when the template-based processor has no packet.

17 Claims, 5 Drawing Sheets

(56) References Cited

U.S. PATENT DOCUMENTS

2020/0313999 A1 10/2020 Lee et al.
2021/0336883 A1 10/2021 Pudiyapura et al.

OTHER PUBLICATIONS

Yuxiang Liu, Timed Data Plane Update in Data Center Network, Jan. 30, 2020, IEEE (Year: 2020).*
International Search Report dated Feb. 8, 2023 in International Application No. PCT/CN2022/134290. English translation attached.

* cited by examiner

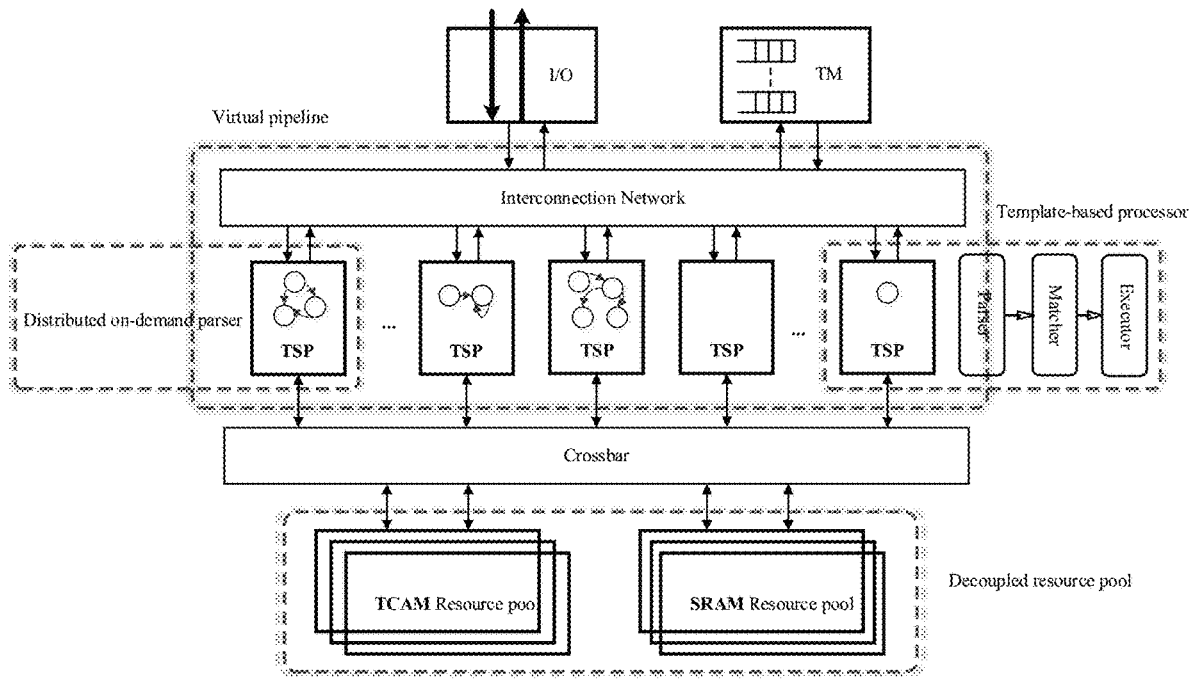

FIG. 3

Split, based on the distributed on-demand parsers, a parsing graph into a plurality of parsing sub-graphs, and distribute each of the plurality of parsing sub-graphs to a respective one of physical stages in the pipeline. The parsing sub-graph at each of the physical stages is configured to instruct a local parsing process to parse out a protocol determined by a user at runtime, and at least one of a protocol adding action, a protocol deleting action, and a protocol modifying action is performed by configuring the parsing sub-graph at a target physical stage ⸺ S101

Adjust, based on the template-based processors and the virtual pipeline, an order between any two of the template-based processors by configuring an interconnection network according to an insert instruction, where any one of the template-based processors functions as a physical stage of an ingress pipeline or a physical stage of an egress pipeline, and a free configuration action is performed by configuring parameters of the template-based processor ⸺ S102

Disaggregate and pool, based on the decoupled resource pool, flow table resources of each of the physical stages, and create a new flow table, recycle a flow table, or modify a specification of a flow table at runtime ⸺ S103

Suspend, based on the fast update controller, packet processing prior to a to-be-updated template-based processor among the template-based processors, and configure or delete the template-based processor from the pipeline when the template-based processor has no packet ⸺ S104

FIG. 4

UPDATING METHOD FOR PROGRAMMABLE DATA PLANE AT RUNTIME, AND APPARATUS

CROSS-REFERENCE TO RELATED APPLICATION

This application is a continuation of International Application No. PCT/CN2022/134290, titled "UPDATING METHOD FOR PROGRAMMABLE DATA PLANE AT RUNTIME, AND APPARATUS", filed on Nov. 25, 2022, which is based on and claims priority to Chinese patent application No. 202210055016.7, filed on Jan. 18, 2022, both of which are incorporated herein by reference in their entireties.

FIELD

The present disclosure relates to the field of computer network technologies, and more particularly, to a method and an apparatus for updating a programmable data plane at runtime.

BACKGROUND

With the development of Software Defined Networking (SDN), programmable switches are commercialized and are gradually becoming the mainstream. The core of programmability is the programmable data plane, which is responsible for protocol parsing and deparsing, and packet processing according to parsing rules and flow table matching rules issued by an external controller. Programmability has brought about major changes in the relationship between device vendors and network operators.

When a new function is launched on a programmable device, the operator does not need to wait for a multi-year release cycle of conventional network devices, and the network operator can use a programming interface of the programmable device to directly and quickly deploy the new function. However, different types of networks require different sets of functions, new protocols and functions constantly emerge, and the demand for throughput in several network scenarios increases, such that integrating all the required features and functions into a single chip becomes increasingly uneconomical. A future network is expected to develop towards autonomy, featuring self-configuration, self-diagnosis, and self-healing capabilities, which can make network operation more dynamic and automated.

However, in an ever-changing network environment, the programmable data plane is required to be programmable at runtime, that is, to have an ability to update data plane functions, update protocols, and add, delete, and modify flow tables at runtime without interrupting ongoing services.

SUMMARY

A method and an apparatus for updating a programmable data plane at runtime, an electronic device, and a storage medium are provided according to the present disclosure, to solve problems of how to freely add, delete, and modify a protocol, freely configure a function, and freely create a flow table, recycle a flow table, and modify a specification of a flow table at runtime.

In a first aspect, a method for updating a programmable data plane at runtime is provided according to an embodiment of the present disclosure. The programmable data plane includes distributed on-demand parsers, template-based processors, a virtual pipeline, a decoupled resource pool, and a fast update controller. The method includes: splitting, based on the distributed on-demand parsers, a parsing graph into a plurality of parsing sub-graphs, and distributing each of the plurality of parsing sub-graphs to a respective one of physical stages in the pipeline, where the parsing sub-graph at each of the physical stages is configured to instruct a local parsing process to parse out a protocol determined by a user at runtime, and at least one of a protocol adding action, a protocol deleting action, and a protocol modifying action is performed by configuring the parsing sub-graph at a target physical stage; adjusting, based on the template-based processors and the virtual pipeline, an order between any two of the template-based processors by configuring an interconnection network by according to an insertion instruction, where any one of the template-based processors functions as a physical stage of an ingress pipeline or a physical stage of an egress pipeline, and a free configuration action is performed by configuring parameters of the template-based processor; disaggregating and pooling, based on the decoupled resource pool, flow table resources of each of the physical stages, and creating a new flow table, recycling a flow table, or modifying a specification of a flow table at runtime; and suspending, based on the fast update controller, packet processing prior to a to-be-updated template-based processor among the template-based processors, and configuring or deleting the template-based processor from the pipeline when the template-based processor has no packet.

Further, the method further includes: setting a template-based processor among the template-based processors which is not inserted into the pipeline for execution in a predetermined low-power mode.

Further, each of the physical stages is a general skeleton composed of primitives that are separated from parameters, and the performing the free configuration action includes: downloading, according to an added function when the user performs configuration, corresponding parameters into the general skeleton.

Further, the method further includes: prior to the disaggregating and pooling the flow table resources of each of the physical stages: interconnecting the physical stage with disaggregating resources by using a static reconfigurable crossbar to update the template-based processor or the flow table by reconfiguring the static reconfigurable crossbar.

Further, the suspending, based on the fast update controller, packet processing prior to a to-be-updated template-based processor among the template-based processors, and configuring or deleting the template-based processor from the pipeline when the template-based processor has no packet includes: successively configuring template-based processors to be updated downwardly along the pipeline, where packet processing prior to a first one of the template-based processors to be updated is suspended, the template-based processor is updated when the template-based processor has no packet, and the template-based processors to be updated are successively updated downwardly along the pipeline; and subsequent to completion of update, deleting all empty-configured template-based processors downwardly along the pipeline. When deleting an empty-configured template-based processor, packet processing prior to the empty-configured template-based processor is suspended, and the empty-configured template-based processor is deleted from the pipeline by configuring a reconfigurable crossbar when data in the empty-configured template-based processor is empty.

Further, the programmable data plane further includes a pipeline-by-pipeline update controller, and the method further includes: updating, based on the pipeline-by-pipeline update controller, pipelines one by one in the data plane. For any one of the pipelines, when updating the pipeline, input of a packet into the pipeline is suspended, when the pipeline has no packet, the pipeline is updated, a packet is inputted into the pipeline subsequent to completion of update, and an un-updated pipeline is selected for updating.

In a second aspect, an apparatus for updating a programmable data plane at runtime is provided according to an embodiment of the present disclosure. The programmable data plane includes distributed on-demand parsers, template-based processors, a virtual pipeline, a decoupled resource pool, and a fast update controller. The apparatus includes a parsing module, a processing module, a storage module, and a fast update module. The parsing module is configured to split, based on the distributed on-demand parsers, a parsing graph into a plurality of parsing sub-graphs, and distribute each of the plurality of parsing sub-graphs to a respective one of physical stages in the virtual pipeline. The parsing sub-graph at each of the physical stages is configured to instruct a local parsing process to parse out a protocol determined by a user at runtime, and at least one of a protocol adding action, a protocol deleting action, and a protocol modifying action is performed by configuring the parsing sub-graph at a target physical stage. The processing module is configured to adjust, based on the template-based processors and the virtual pipeline, an order between any two of the template-based processors by configuring an interconnection network according to an insertion instruction. Any one of the template-based processors functions as a physical stage of an ingress pipeline or a physical stage of an egress pipeline, and a free configuration action is performed by configuring parameters of the template-based processor. The storage module is configured to disaggregate and pool, based on the decoupled resource pool, flow table resources of each of the physical stages, and create a new flow table, recycle a flow table, or modify a specification of a flow table at runtime. The fast update module is configured to suspend, based on the fast update controller, packet processing prior to a to-be-updated template-based processor among the template-based processors, and configure or delete the template-based processor from the virtual pipeline when the template-based processor has no packet.

Further, the apparatus further includes: a setting module configured to set a template-based processor among the template-based processors which is not inserted into the virtual pipeline for execution in a predetermined low-power mode.

Further, each of the physical stages is a general skeleton composed of primitives that are separated from parameters, and the processing module is further configured to: download, according to an added function when the user performs configuration, corresponding parameters into the general skeleton.

Further, the apparatus further includes a crossbar module configured to, prior to disaggregating and pooling the flow table resources of each of the physical stages: interconnect the physical stage with disaggregating resources by using a static reconfigurable crossbar to update the template-based processor or the flow table by reconfiguring the static reconfigurable crossbar.

Further, the fast update module is further configured to: successively configure template-based processors to be updated downwardly along the virtual pipeline. Packet processing prior to a first one of the template-based processors to be updated is suspended, the template-based processor is updated when the template-based processor has no packet, and the template-based processors to be updated are successively updated downwardly along the virtual pipeline; and subsequent to completion of update, delete all empty-configured template-based processors downwardly along the virtual pipeline. When deleting an empty-configured template-based processor, packet processing prior to the empty-configured template-based processor is suspended, and the empty-configured template-based processor is deleted from the virtual pipeline by configuring a reconfigurable crossbar when data in the empty-configured template-based processor is empty.

Further, the programmable data plane further includes a pipeline-by-pipeline update controller, and the apparatus further includes: a one-by-one update module configured to update, based on the pipeline-by-pipeline update controller, virtual pipelines one by one in the data plane. For any one of the virtual pipelines, when updating the virtual pipeline, input of a packet into the virtual pipeline is suspended, and when the virtual pipeline has no packet, the virtual pipeline is updated, a packet is inputted into the virtual pipeline subsequent to completion of update, and an un-updated virtual pipeline is selected for updating.

In a third aspect, an electronic device is provided according to an embodiment of the present disclosure. The electronic device includes: a memory; a processor; and a computer program stored on the memory and executable on the processor, the processor being configured to execute the program to implement the method for updating the programmable data plane at runtime according to the above embodiments.

In a fourth aspect, a computer-readable storage medium is provided according to an embodiment of the present disclosure. The computer-readable storage medium stores a computer program. The program is configured to implement, when executed by a processor, the method for updating the programmable data plane at runtime according to the above embodiments.

Therefore, the present disclosure at least provides the following advantageous effects.

The protocol can be added, deleted, and modified at runtime, which is beneficial for the user to test or deploy a new protocol, and delete an outdated or redundant protocol. Function logic can be added, deleted, and modified at runtime. For a network device providing multi-tenant application services, a network operator can add a new user service without affecting other users, or directly delete a user when the service of the user service expires. The flow table can be created and recycled, and the specification of the flow table can be modified at runtime to improve the utilization rate of storage resources in the network device. Therefore, problems of how to freely add, delete, and modify the protocol, freely configure functions, and freely create the flow table, recycle the flow table and modify the specification of the flow table at runtime are solved.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings.

FIG. 3 is a schematic diagram showing an overall architecture of IPSA according to an embodiment of the present disclosure.

FIG. 4 is a flowchart of a method for updating a programmable data plane at runtime according to an embodiment of the present disclosure.

DETAILED DESCRIPTION

Figure 1:
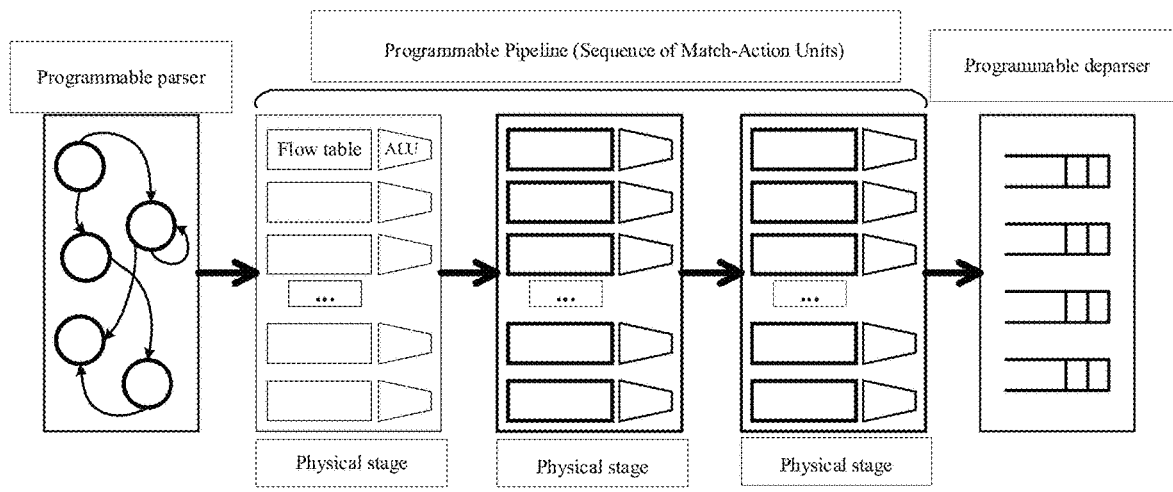
FIG. 1 is a schematic diagram showing a technical architecture of RMT in the related art.

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limit, the present disclosure.

In the related art, Reconfigurable Match Table (RMT) is a technical prototype of an existing programmable switch Tofino. As illustrated in FIG. 1, RMT offers a fundamental abstraction of "parser-pipeline-deparser". A user can write a protocol-independent language P4 program of an underlying architecture, to achieve programmable and customized protocols, flow tables and functions on a device. Before a programmable parser operates, the user determines a parsing state transition graph. When a packet reaches an input port, a parser parses out protocols and fields. A pipeline is composed of a series of serial physical stages, each of which contains a plurality of Match Action Units (MAUs). MAU is a basic reconfigurable unit of the prototype. The user can determine a flow table specification and an action primitive in the P4 program to perform programming on the MAU, to determine, for example, which flow table is to be looked up for the packet in a current physical stage, and what processing logic is to be executed after a lookup result is obtained. The MAU has different logical behaviors under different configurations, to realize user-specific processing and forwarding functions. A programmable deparser reassembles the protocols into a packet payload in a user-specified protocol order.

Based on the RMT technology, a network function can be customized through the protocol-independent language P4. But after compilation and deployment, underlying configuration of a programmable device is fixed, and reconfiguration requires suspending packet processing, recompiling the program, and downloading and replacing the underlying configuration. For mainstream applications such as a multi-tenant service update, a stateful application update, and a hot-swappable in-network computing, downtime configuration greatly affects quality of service. According to statistics, the switch Tofino having 64 ports of 100G needs 50 ms of downtime for update, during which 37 GiB of data may be lost at a full speed state. Further, it takes longer to re-download the flow table.

Protocol-Oblivious Forwarding (POF) adopts an abstraction of "offset plus length" to express a protocol, which does not address the content of the protocol and eliminates dependence between protocols, to achieve complete protocol independence, such that a programmable data plane can be realized, in which the user can customize their own protocols freely. Also, in POF, a specific instruction set is used to adapt to the protocol abstraction of "offset plus length", and simple instruction switching is used to achieve function update, which can enhance the packet processing ability of the programmable data plane. In the POF, each function is a module. The user can perform hot-swap on the module through programming in combination with an underlying instruction set to realize reconfiguration at runtime. However, the POF is implemented on a software network processor, and therefore has a far slower processing speed than an ASIC hardware switch. Therefore, application of the POF is limited.

Figure 2:
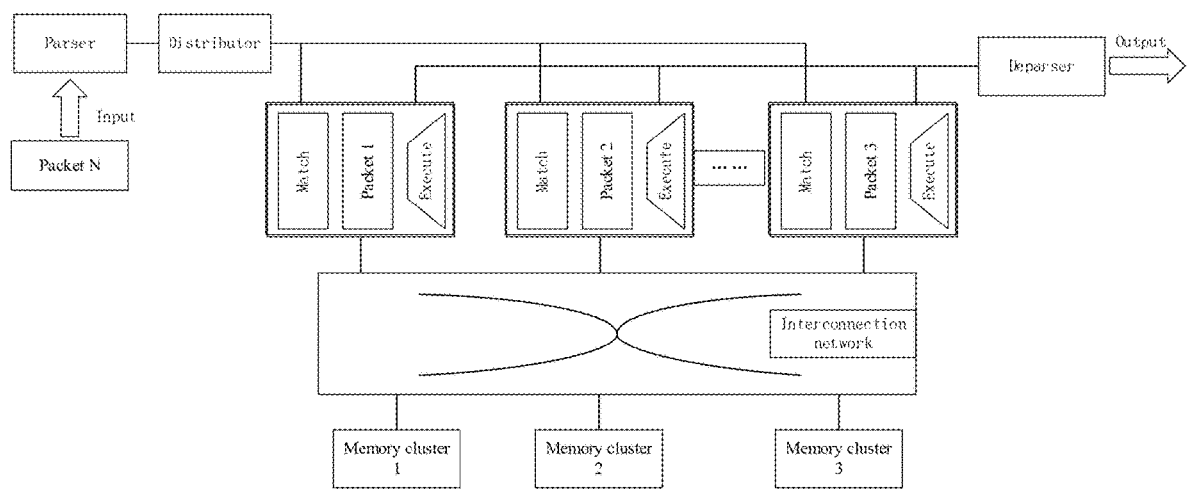
FIG. 2 is a schematic diagram showing a technical architecture of dRMT in the related art.

A disaggregated Reconfigurable Match-Action Table (dRMT), on a basis of the RMT, decouples flow table resources from packet processing logic resources. The processor accesses the flow table resources in a memory cluster through a switching network, as illustrated in FIG. 2. Unlike the packet processing manner of RMT pipelines, in dRMT, multiple processors process packets in parallel, each processor contains a complete packet processing program, and a scheduler is used to avoid memory access conflicts between different processors. The dRMT builds a flow table resource pool to solve a problem in the RMT that a single physical stage cannot accommodate a large flow table. Therefore, programmability of the data plane is improved and more network applications are supported. Also, the resource pooling in dRMT is conducive to reconfiguration, that is, creating the flow table, recycling the flow table, and modifying the specification of the flow table, at runtime. But the dRMT adopts a packet processing mode of "Run-to-Completion" (RTC), which does not support modification of protocols, functions, and flow tables at runtime. A system design of the dRMT does not involve the reconfiguration at runtime, and does not provide a reconfiguration interface for the user.

Therefore, a switching chip that is programmable at runtime, and a method and an apparatus for realizing fast and uninterrupted update at runtime are provided according to the embodiments of the present disclosure, which solve the following technical problems.

(1) How to design the underlying architecture to allow the device to support updating protocols, packet processing functions, and flow tables at runtime, including adding, deleting, and modifying the protocols and packet processing logic, creating the flow table, recycling the flow table, and modify the specification of the flow table at runtime.

(2) How to support the user to perform reconfiguration of a reconfiguration data plane at runtime.

(3) How to update an underlying device quickly and without interruption.

A method and an apparatus for updating a programmable data plane at runtime, an electronic device, and a storage medium according to the embodiments of the present disclosure are described below with reference to the accompanying drawings. The programmable data plane includes distributed on-demand parsers, template-based processors, a virtual pipeline, a decoupled resource pool, and a fast update controller. The fast update controller controls update of the template-based processor and update of the overall pipeline. To achieve updating of the data plane protocol, the function, and the specification of the flow table at runtime, a programmable data plane In-situ Programmable Switch Architecture (IPSA) is provided according to an embodiment of the present disclosure, which enables the data plane to support updating at runtime, as illustrated in FIG. 3. The IPSA includes four parts: distributed on-demand parsers, template-based processors, a virtual pipeline, and a decoupled resource pool.

The following is a description of the method for updating a programmable data plane at runtime in conjunction with FIG. 4. The method includes following steps S101 to S104.

In step S101, a parsing graph is split into a plurality of parsing sub-graphs based on the distributed on-demand parsers, and each of the plurality of parsing sub-graphs is distributed to a respective one of physical stages in the virtual pipeline. The parsing sub-graph at each of the physical stages is configured to instruct a local parsing process, to parse out a protocol determined by a user at runtime. At least one of a protocol adding action, a protocol deleting action, and a protocol modifying action is performed by configuring the parsing sub-graph at a target physical stage.

It should be understood that, in the embodiment of the present disclosure, the protocol adding action, the protocol deleting action, and/or the protocol modifying action are performed by configuring a parsing sub-graph specific to a template-based processor, so as to add, delete, and modify the protocols at runtime, which is beneficial for the user to test or deploy a new protocol and delete an outdated or redundant protocol. Therefore, a problem of freely adding, deleting, and modifying the protocols at runtime can be solved.

Modularization is a basis for realizing programmability at runtime. There may be a plurality of functions in the data plane, and adding, deleting, or modifying a single functional module should not affect normal operation of other functions. In the related art, parsing of the protocol is before all functions. Decoupling of protocol parsing from functions, which is referred to as vertical decoupling is achieved, but is inconducive to adding, deleting, and modifying a single function, since the plurality of functions are still intercoupled.

In the new architecture according to the embodiment of the present disclosure, the front-end parser of the conventional programmable data plane is eliminated, a complete parsing graph is split into parsing sub-graphs, which are distributed to respective stages in the pipeline, which can ensure self-sufficiency of each stage in the pipeline and avoid unnecessary parsing. The parsing cost is shared among stages in the pipeline, and the data plane throughput is not limited by complexity of the parsing graph, which makes the design more scalable. When updating of functions involves protocols, only the involved functional module is updated without affecting the normal operation of other functions.

Figure 5:
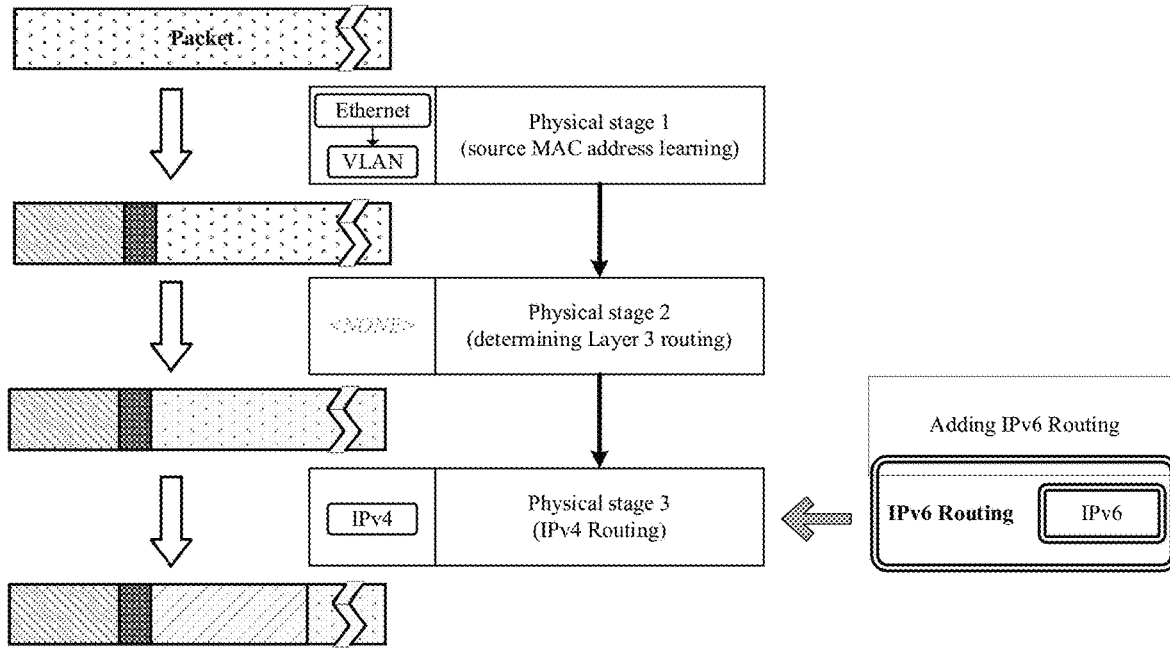
FIG. 5 is a schematic structural diagram of a distributed on-demand parser according to an embodiment of the present disclosure.

As illustrated in FIG. 5, the parsing sub-graph at each stage is used to instruct the local parsing process. What flows in the pipeline is a fixed quantity of bytes of the packet plus a parsing result. When a physical stage is reached, a corresponding protocol is parsed out. The parsing result is indication information of a message header, that is, a binary set of {header ID, header length}. A configuration parameter {field inner offset, field length} is used to obtain the field when fields inside the packet header are required. The parsing results are passed to subsequent stages to avoid unnecessary re-parsing. At runtime, the user adds Internet Protocol version 6 (IPv6) to Physical Stage 3, such that the data plane supports both IPv4 routing and IPV6 routing. This design eliminates the front-end parser while avoiding reassembly of the packet header by a deparser.

In an embodiment, when the processing logic involves inserting or deleting the packet header, the method further includes updating the parsing result using an offset management module.

It should be understood that to ensure correctness of delivered information, the offset management module is configured to update the parsing result when a length of the packet changes (e.g., when pushing or popping up an MPLS label).

In step S102, based on the template-based processors and the virtual pipeline, an order between any two of the template-based processors is adjusted by configuring an interconnection network according to an insertion instruction. Any one of the template-based processors functions as a physical stage of an ingress pipeline or a physical stage of an egress pipeline, and a free configuration action is performed by configuring parameters of the template-based processor.

It should be understood that, in the embodiment of the present disclosure, the function logic may be added, deleted and modified at runtime. For a network device providing multi-tenant application services, a network operator can add a new user service or directly delete a user when a service for the user expires without affecting other users, to achieve free configuration of functions at runtime.

It should be noted that, in the embodiment of the present disclosure, different types of interconnection networks, such as a crossbar, Clos, and Bens may be adopted, to realize the virtual pipeline. The virtual pipeline can also be realized using interconnection networks of various scales. For example, for 32 template-based processors, a 32*32 crossbar interconnection network is used, or two 16*16 crossbar interconnection networks are used, etc., to accommodate different resource consumption and meet demand of flexibility.

Figure 6:
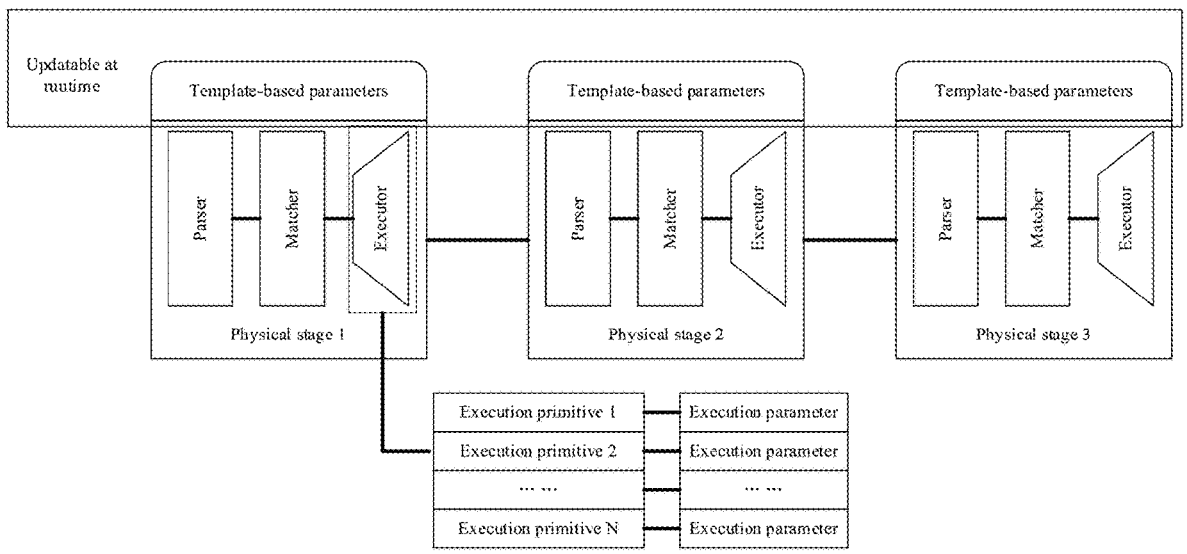
FIG. 6 is a schematic structural diagram of a template-based processor according to an embodiment of the present disclosure.

Each physical stage of the programmable data plane in the related art includes two parts: field matching and logic execution, namely MAU. In an embodiment of the present disclosure, the distributed on-demand parsers are adopted, as illustrated in FIG. 6, where each physical stage includes three sub-modules: a parser, a matcher, and an executor. Functions of the matcher and the executor are similar to that in the architecture of the RMT. The parser is responsible for parsing out a user-specified protocol and representing the protocol in the protocol-independent format {offset, length}. The physical stages of the new pipeline architecture are loosely coupled. Therefore, the controller can program each physical phase independently.

In an embodiment, each of the physical stages is a general skeleton composed of primitives that are separated from parameters, and the performing the free configuration action includes: downloading, according to an added function when the user performs configuration, corresponding parameters into the general skeleton.

As illustrated in FIG. 6, in the embodiment of the present disclosure, by separating primitives from parameters, each physical stage becomes a parameterized skeleton, and adding a function during a user configuration stage is implemented by downloading corresponding parameters into the skeleton. For a key element required in each stage, the following abstraction is adopted in the new architecture: (1) a packet header field is abstracted as {offset, length}, which realizes complete protocol independence; (2) the flow table is abstracted as {flow table type, flow table depth, flow table entry width, match key}, such that the user may modify the flow table abstraction to match different flow tables; (3) an execution action is abstracted as a set of ordered execution primitives and execution parameters, such that the user may configure the execution parameters to modify the execution action. In the embodiments of the present disclosure, the above design is referred to as a template-based stage processor (TSP), which is the key part of implementing update and configuration at runtime.

Further, subsequent to solving the problem of configuring a single TSP at runtime, a problem of flexible arrangement of physical stages of the entire pipeline is to be solved. Different from the physical stages of the RMT architecture that are hardwired and thus are incompatible with function insertion and function deletion, the virtual pipeline is adopted according to an embodiment of the present disclosure, where a reconfigurable non-blocking interconnection network (such as a crossbar, CLOS network, etc.) between the TSPs is adopted to realize normal operation of the pipeline. The processors of the RMT architecture are connected in series, which is not conductive to insertion of new functions. In contrast, with the virtual pipeline, an order between the processors is floating. That is, the user may adjust the order between any two processors by configuring the interconnection network to flexibly insert a new function.

Figure 7:
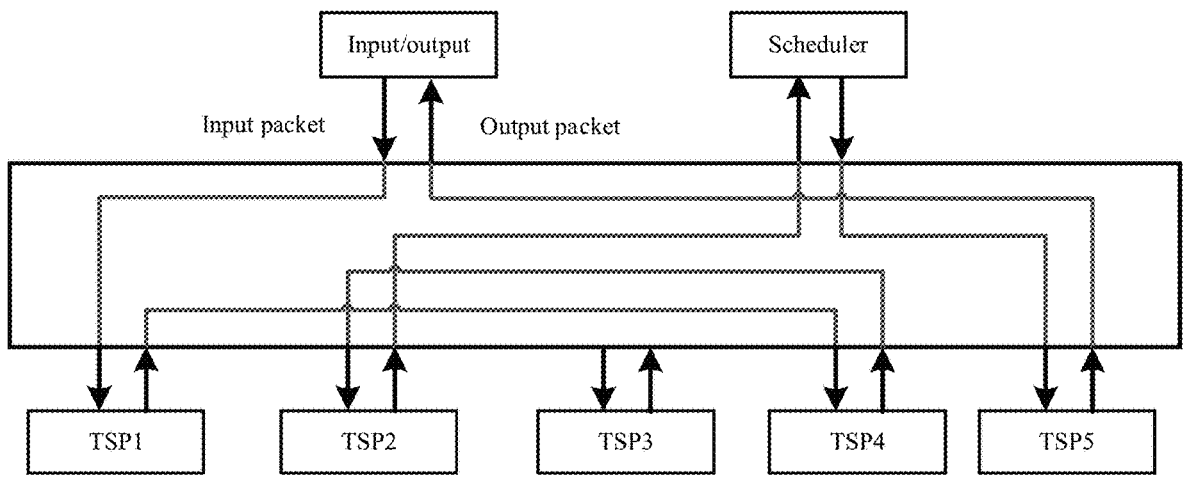
FIG. 7 is a schematic diagram of a virtual pipeline according to an embodiment of the present disclosure.

As illustrated in FIG. 7, by adding a packet input/output module and a traffic management scheduler module to the interconnection network, a virtual pipeline is dynamically generated. That is, a connection may be formed between any two template-based processors, between the template-based processor and the packet input/output module, or between the template-based processor and the traffic manager. In FIG. 7, the pipeline order is "Input-TSP1-TSP4-TSP2-Scheduler-TSP5-Output". Any template-based processor may function as the physical stage of the ingress pipeline or the physical stage of the egress pipeline, which can improve flexibility of designs of the ingress and the egress of the data plane.

In an embodiment of the present disclosure, the method further includes: setting a template-based processor among the template-based processors which is not inserted into the pipeline for execution in a predetermined low-power mode.

The predetermined low-power mode may be set as desired. The present disclosure is not limited in this regard.

It should be understood that when the template-based processor does not have a pipeline stage to execute, the template-based processor may be set in a low-power mode.

In step S103, flow table resources of each of the physical stages is disaggregated and pooled based on the decoupled resource pool, and a new flow table is created, a flow table is recycled, or a specification of a flow table is modified, at runtime.

It should be understood that in the embodiment of the present disclosure, a flow table may be created or recycled, or a specification of a flow table may be modified at runtime, to improve the utilization rate of storage resources in the network device. Therefore, by using the decoupled resource pool, storage resource blocks can be freely combined to create a new flow table, solving the problem of creating a flow table, recycling a flow table, and modifying the specification of a flow table at runtime.

Updating a flow table at runtime means flexibly creating the flow table, recycling the flow table, or modifying the specification of the flow table without interrupting the current flow traffic, rather than adding, deleting, and modifying a flow table entry. In the programmable data plane architecture in the related art, the storage resource (TCAM and SRAM) is uniformly distributed among all physical stages. However, resources required for respective stages may be different, and thus this resource allocation method has disadvantages of uneven resource utilization and inability to perform incremental updates. To update the flow table at runtime, the decoupled storage resource pool is adopted in the embodiment of the present disclosure, where the flow table resources originally in each physical stage is disaggregated and pooled, to improve flexibility of flow table management. Further, the storage resource blocks may be arbitrarily combined or split in the decoupled resource pool, to achieve creation and recycling of the flow table at runtime.

In an embodiment, the method further includes: prior to disaggregating and pooling the flow table resources of each of the physical stages, interconnecting the physical stage with disaggregating resources by using a static reconfigurable crossbar, to update the template-based processor or the flow table by reconfiguring the static reconfigurable crossbar.

Figure 8:
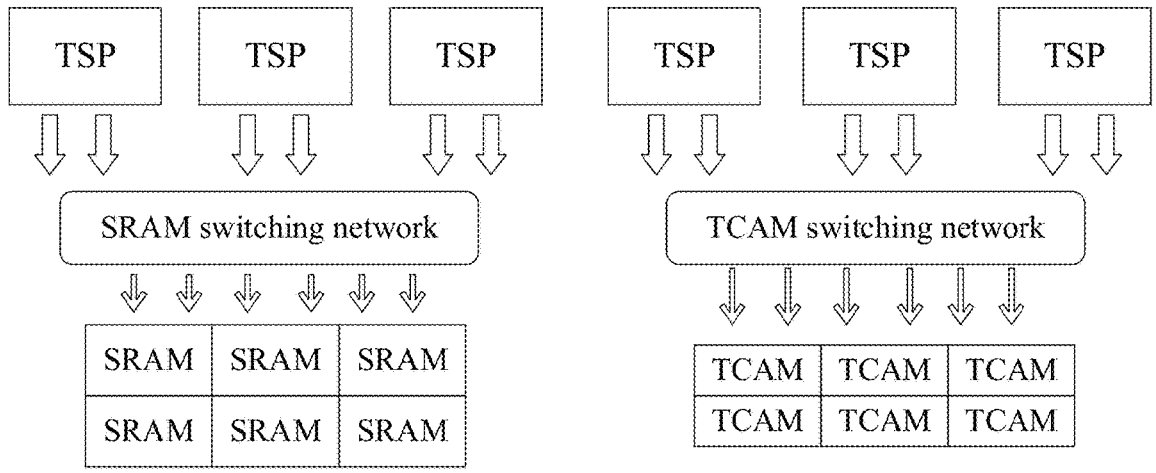
FIG. 8 is a schematic diagram of a decoupled resource pool according to an embodiment of the present disclosure.

As illustrated in FIG. 8, in the embodiment of present disclosure, based on the decoupled storage, a static reconfigurable crossbar for interconnection between the physical stages and the storage resources is adopted. Update of the template-based processor or the flow table is implemented by reconfiguration of the crossbar. The IPSA offers an interface for resource pool modification. When a new flow table is to be created, the user controls the resource pool to create the new flow table through the interface. That is, a plurality of Static Random-Access Memory (SRAM) blocks or Ternary Content-Addressable Memory (TCAM) blocks are combined. For example, to create a flow table having a specification of 2w*4d, 8 SRAMs each having a specification of w*d may be combined to form the flow table specified by the user. The same may be applied for deleting a flow table and modifying the specification of a flow table. To improve architectural scalability, the template-based processors and the storage resources may be divided into a plurality of clusters, each with one "template-based processor-storage resource" crossbar. The one-to-one mapping between the processor and the flow table avoids memory access conflicts.

The technical principle and the system architecture of the data plane that is programmable at runtime in the embodiments are introduced above. In the following, a network programming language and a configuration interface for the user to perform reconfiguration at runtime are described in detail.

Figure 9:
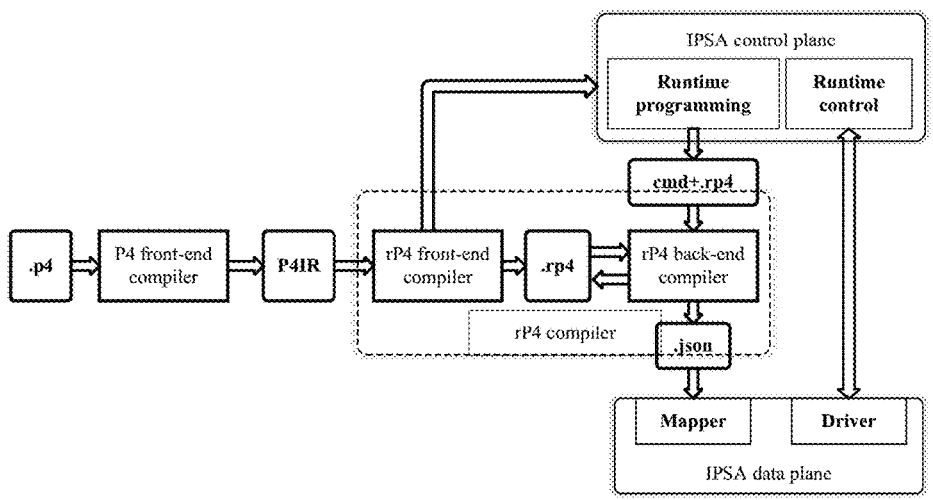
FIG. 9 is a schematic flowchart of a programming process at runtime according to an embodiment of the present disclosure.

In the related art, the programmable switch supports P4 Language to configure underlying forwarding and processing functions. When the switch is in operation, a runtime environment provided by the P4 supports only addition, deletion, and modification of a flow table entry, but does not support addition, deletion, and modification of the protocol, the flow table, and the logic processing function. According to an embodiment of the present disclosure, based on the IPSA data plane, the P4 Language is extended to design an IPSA control plane. An overall programming procedure is as follows, as illustrated in FIG. 9.

A user-written P4 program is translated, by using a P4 front-end compiler, to P4 Intermediate Representation (P4IR), which is passed to a rP4 compiler. The P4IR is translated to a rP4 file by using a rP4 front end compiler for modification at runtime, and then the rP4 file is compiled, by using a rP4 back-end compiler, into a json configuration file specific to an IPSA device, which is dispatched to the IPSA data plane for execution. At runtime, the IPSA data plane provides the user with an interface of adding, deleting, and modifying the protocol, the function and the flow table. After the user writes incremental rP4 codes and a corresponding configuration instruction, which is subsequently compiled by the rP4 back-end compiler, update configuration is dispatched to the IPSA data plane and an update part is written back to the rP4 Program for future update.

rP4 Language is extension of P4 Language. rP4 divides a physical stage into three parts of "parser-matcher-executor". The user may provide specific parameters for templates of the three parts to support a specific function. Also, rP4 supports code snippet programming. The user may write a rP4 code snippet for implementing a specific function without considering constraints similar to those in P4. Functionality represented by the code snippet is loaded into the underlying device by instructions.

In step S104, based on the fast update controller, packet processing prior to a to-be-updated template-based processor among the template-based processors is suspended, and the template-based processor is configured or deleted from the pipeline when the template-based processor has no packet.

It should be understood that in the embodiments of the present disclosure, update is rapidly performed without interruption, which means, update of the function, the protocol and the flow table of the data plane is realized in the shortest possible time, during which normal packet processing and forwarding are not interrupted.

Step S104 includes updating configuration of the template-based processor and deleting an empty processor. In an embodiment, step S104 includes: successively configuring template-based processors to be updated downwardly along the pipeline, where packet processing prior to a first one of the template-based processors to be updated is suspended, the template-based processor is updated when the template-based processor has no packet, and the template-based processors to be updated are successively updated downwardly along the virtual pipeline; and subsequent to completion of update, deleting all empty-configured template-based processors downwardly along the pipeline, where when deleting an empty-configured template-based processor, packet processing prior to the empty-configured template-based processor is suspended, and the empty-configured template-based processor is deleted from the pipeline by configuring a reconfigurable crossbar when data in the empty-configured template-based processor is empty.

It should be understood that, in the embodiment of the present disclosure, for a to-be-updated template-based processor among the template-based processors in the pipeline, packet processing prior to the template-based processor is suspended based on the fast update controller. When the template-based processor has no packet, the template-based processor is updated. When there is an empty-configured template-based processor in the pipeline, in the same manner, when the empty-configured processor has no packet, the empty-configured processor is deleted from the pipeline by configuring the reconfigurable switching network.

The IPSA architecture supports update of underlying functionality at runtime, while a runtime interface provided by the rP4 is used for the user to make runtime modifications. In addition to the above, an update mechanism is required, in such a manner that updates can take effect quickly without affecting normal operations of flow traffic. Each function has a different mapping manner in the underlying physical stage. One function may be mapped to one physical stage or to different neighboring or non-neighboring physical stages. When updating one function, consistency of the packet processing should be ensured. That is, the packet is processed either by a new function or by an old function, and cannot be processed partially by the new function and partially by the old function. The present disclosure provides a bubble-based pipeline physical stage update scheme.

Figure 10:
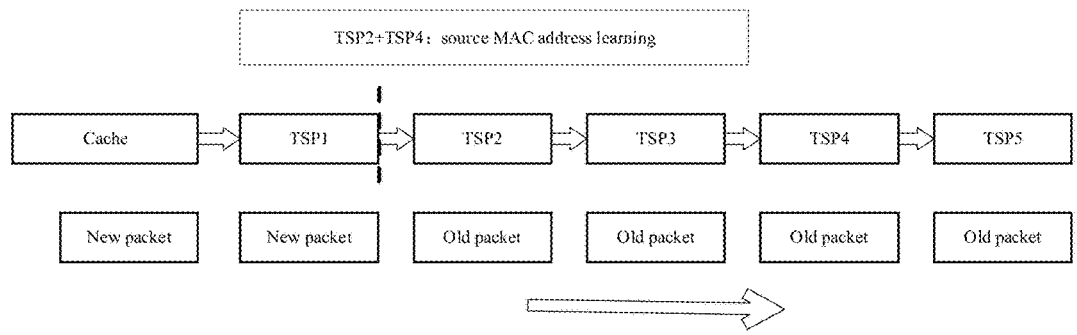
FIG. 10 is a schematic diagram showing an uninterrupted update example according to an embodiment of the present disclosure.

As illustrated in FIG. 10, TSP2 and TSP4 jointly constitute a source MAC address learning function. When the user wants to delete this function, packet processing prior to TSP2 is paused. After TSP2 finishes processing remaining packets, TSP2 is empty. That is, a large bubble exists in TSP2. In this case, internal configuration of TSP2 is deleted, previous processing on TSP2 is released, and when a new packet arrives at TSP2, the new packet is no longer processed by original configuration. The large bubble located at TSP2 moves backwards along the pipeline to a to-be-updated TSP, at which updating is directly performed. In this way, the new packet is not processed by the old function, and the old packets is not processed by the new function. The large bubble update method according to the present disclosure occupies only an additional capacity of (T+d) in a buffer, where T represents a quantity of clock cycles needed to drain the TSP to be updated, and d represents a quantity of clock cycles required to configure the TSP. In addition, the update method according to the present disclosure has an update effective time of (T+d) clock cycles.

Subsequent to completion of configuration for update, the pipeline needs to be rearranged. That is, an unconfigured TSP is deleted. The above operations are repeated. That is, when a TSP is to be deleted, packet processing prior to the TSP is suspended. Newly entered packets during this period are received by the buffer. When the to-be-deleted TSP is empty, the TSP is deleted. The above procedure is performed downwardly along the pipeline until all empty-configured TSPs are deleted. The above update is performed in the background does not affect normal processing of packets.

Further, the programmable data plane further includes a pipeline-by-pipeline update controller. The method according to the embodiments of the present disclosure further includes: updating, based on the pipeline-by-pipeline update controller, pipelines one by one in the data plane. For any one of the pipelines, when updating configuration of the pipeline, input of a packet into the pipeline is suspended. When the pipeline has no packet, the pipeline is updated, a packet is inputted into the pipeline subsequent to completion of update, and an un-updated pipeline is selected for updating.

It should be understood that based on the pipeline-by-pipeline update controller, the user may select the update method to update the pipelines in the programmable data plane one by one. In an exemplary embodiment of the present disclosure, a pipeline is selected, the packets are suspended from flowing into the pipeline. When the pipeline has no packet processing, configuration in the pipeline is updated. After the update is completed, the packets normally enter the pipeline. An un-updated pipeline is selected for updating until all pipelines are updated by repeating the steps.

In summary, according to the embodiments of the present disclosure, technologies including the distributed on-demand parser, the template-based stage processor, the virtual pipeline, and the decoupled resource pool are used to realize runtime update of a switch data plane, and the system architecture IPSA that supports updating the protocol, the function, and the flow table at runtime is provided. Also, the rP4 Language as an extension of the P4 Language is provided, which provides interfaces for reconfiguring the protocol, the function, and the flow table at runtime. The pipeline update method based on the large bubble is provided to realize real-time and non-interrupt update of the underlying device.

With the method for updating the programmable data plane at runtime according to the embodiments of the present disclosure, the protocol can be added, deleted, and modified at runtime, which is beneficial for the user to test or deploy a new protocol, and delete an outdated or redundant protocol. Function logic can be added, deleted, and modified at runtime. For the network device providing multi-tenant application services, the network operator can add a new user service without affecting other users, or directly delete a user when the service for the user expires. The flow table can be created and recycled, and the specification of the flow table can be modified at runtime to improve the utilization rate of storage resources in the network device. The user performs runtime update by using rP4, which is extension of P4. The user can implement the runtime update in a simple and convenient manner, which does not affect normal packet processing. Therefore, the real-time and non-interrupt update can be realized, and the function can take effect immediately.

Next, an apparatus for updating a programmable data plane at runtime according to an embodiment of the present disclosure is described with reference to the accompanying drawings.

Figure 11:
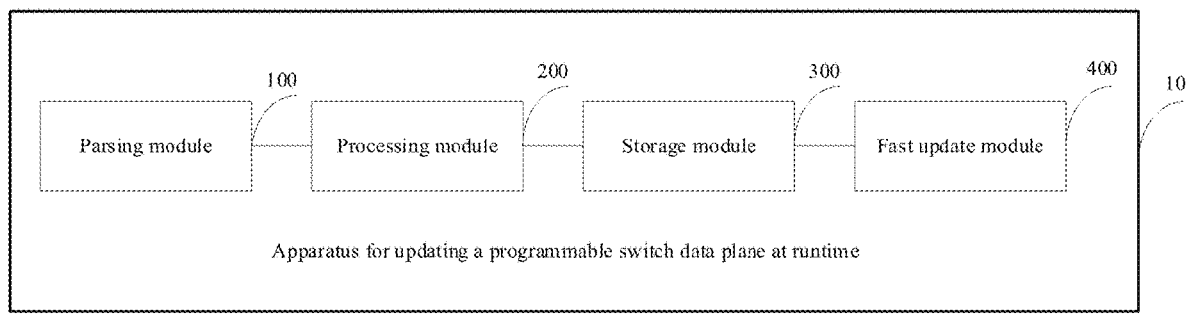
FIG. 11 is a schematic diagram of an apparatus for updating a programmable data plane at runtime according to an embodiment of the present disclosure.

FIG. 11 is a schematic diagram of an apparatus for updating a programmable data plane at runtime according to an embodiment of the present disclosure.

The programmable data plane includes distributed on-demand parsers, template-based processors, a virtual pipeline, a decoupled resource pool, and a fast update controller. As shown in FIG. 11, The apparatus 10 for updating a programmable data plane at runtime includes a parsing module 100, a processing module 200, a storage module 300, and a fast update module 400.

The parsing module 100 is configured to split, based on the distributed on-demand parsers, a parsing graph into a plurality of parsing sub-graphs, and distribute each of the plurality of parsing sub-graphs to a respective one of physical stages in the virtual pipeline. The parsing sub-graph at each of the physical stages is configured to instruct a local parsing process to parse out a protocol determined by a user at runtime to perform at least one of a protocol adding action, a protocol deleting action, and a protocol modifying action. The processing module 200 is configured to adjust, based on the template-based processors and the virtual pipeline, an order between any two of the template-based processors by configuring an interconnection network according to an insertion instruction. The template-based processor may function as a physical stage of an ingress pipeline or a physical stage of an egress pipeline, and a free configuration action is performed by configuring parameters of the template-based processor. The storage module 300 is configured to disaggregate and pool, based on the decoupled resource pool, flow table resources of each of the physical stages, and create a new flow table, recycle a flow table, or modify a specification of a flow table at runtime. The update module 400 is configured to suspend, based on the fast update controller, packet processing prior to a to-be-updated template-based processor among the template-based processors, and configure or delete the template-based processor from the virtual pipeline when the template-based processor has no packet.

Further, the apparatus 10 according to an embodiment of the present disclosure further includes: a setting module configured to set a template-based processor among the template-based processors which is not inserted into the virtual pipeline for execution in a predetermined low-power mode.

Further, the apparatus 10 according to an embodiment of the present disclosure further includes a detection module configured to detect whether a length of a packet changes after a protocol determined by the user is parsed out. When change of the length of the message is detected, the parsing result is updated by using an offset management module is configured to update.

Further, each of the physical stages is a general skeleton composed of primitives that are separated from parameters, and the processing module 200 is further configured to: download, according to an added function when the user performs configuration, corresponding parameters into the general skeleton.

Further, the apparatus 10 according to an embodiment of the present disclosure further includes a crossbar module configured to, prior to disaggregating and pooling the flow table resources of each of the physical stages: interconnect the physical stage with disaggregating resources by using a static reconfigurable crossbar to update the template-based processor or the flow table by reconfiguring the static reconfigurable crossbar.

Further, the fast update module 400 is further configured to: successively configure template-based processors to be updated downwardly along the virtual pipeline. Packet processing prior to a first one of the template-based processors to be updated is suspended, the template-based processor is updated when the template-based processor has no packet, and the template-based processors to be updated are successively updated downwardly along the virtual pipeline; and subsequent to completion of update, delete all empty-configured template-based processors downwardly along the virtual pipeline. When deleting an empty-configured template-based processor, packet processing prior to the empty-configured template-based processor is suspended, and the empty-configured template-based processor is deleted from the virtual pipeline by configuring a reconfigurable crossbar when data in the empty-configured template-based processor is empty.

Further, the programmable data plane further includes a pipeline-by-pipeline update controller, and the apparatus 10 according to an embodiment of the present disclosure further includes: a one-by-one update module configured to update, based on the pipeline-by-pipeline update controller, virtual pipelines one by one in the data plane. For any one of the virtual pipelines, when updating the virtual pipeline, input of a packet into the virtual pipeline is suspended, and when the virtual pipeline has no packet, the virtual pipeline is updated, a packet is inputted into the virtual pipeline subsequent to completion of update, and an un-updated virtual pipeline is selected for updating.

It should be noted that foregoing explanatory description of the embodiment of the method for updating the programmable data plane at runtime is also applicable to the apparatus for updating the programmable data plane at runtime of the embodiment, and thus details thereof will be omitted here.

With the apparatus for updating the programmable data plane at runtime according to the embodiments of the present disclosure, the protocol can be added, deleted, and modified at runtime, which is beneficial for the user to test or deploy a new protocol, and delete an outdated or redundant protocol. Function logic can be added, deleted, and modified at runtime. For the network device providing multi-tenant application services, the network operator can add a new user service without affecting other users, or directly delete a user when the service for the user expires. The flow table can be created and recycled, and the specification of the flow table can be modified at runtime to improve the utilization rate of storage resources in the network device. The user performs runtime update by using rP4, which is extension of P4. The user can implement the runtime update in a simple and convenient manner, which does not affect normal packet processing. Therefore, the real-time and non-interrupt update can be realized, and the function can take effect immediately.

Figure 12:
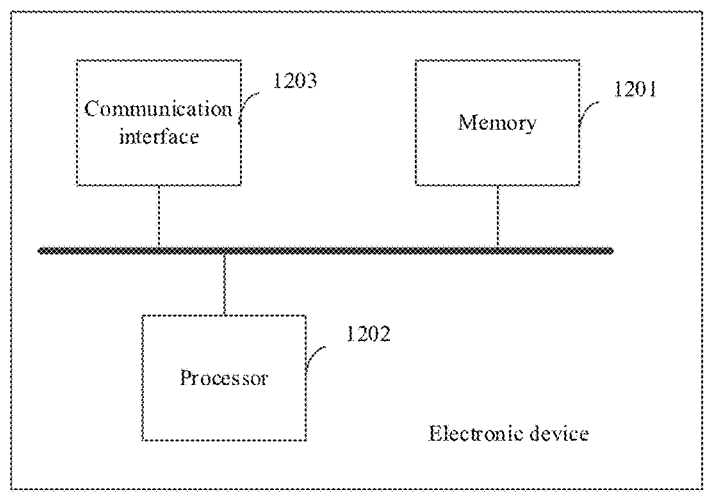
FIG. 12 is a schematic structural diagram of an electronic device according to an embodiment of the present disclosure.

FIG. 12 is a schematic structural diagram of an electronic device according to an embodiment of the present disclosure.

The electronic device may include: a memory 1201; a processor 1202; and a computer program stored on the memory 1201 and executable on the processor 1202.

The processor 1202 is configured to execute the program to implement the method for updating the programmable data plane at runtime according to the above embodiments.

Further, the electronic device further includes:

a communication interface configured to perform communication between the memory 1201 and the processor 1202.

The memory 1201 is configured to store the computer program executable on the processor 1202.

The memory 1201 may include a high-speed Random Access Memory (RAM) and may also include a non-volatile memory, such as a magnetic disk storage.

If the memory 1201, the processor 1202, and the communication interface 1203 are implemented independently, the communication interface 1203, the memory 1201, and the processor 1202 can be connected to one another and in communication with one another through a bus. The bus may be an Industry Standard Architecture (ISA) bus, a Peripheral Component Interconnect (PCI) bus, or an Extended Industry Standard Architecture (EISA) bus, or the like. The bus may be classified into an address bus, a data bus, a control bus, etc. For ease of representation, in FIG. 12 the bus is represented by only one thick line, which does not mean that there is only one bus or one type of bus.

In another exemplary embodiment of the present disclosure, in a specific implementation, if the memory 1201, the processor 1202, and the communication interface 1203 are integrated at a chip, mutual communication between the memory 1201, the processor 1202, and the communication interface 1203 can be completed through an internal interface.

The processor 1202 may be a Central Processing Unit (CPU), or an Application Specific Integrated Circuit (ASIC), or one or more integrated circuits configured to implement the embodiments of the present disclosure.

The embodiments of the present disclosure further provide a computer-readable storage medium, on which the computer program is stored. The program, when being executed by the processor, is configured to implement the method for updating the programmable data plane at runtime as mentioned above.

In the present disclosure, the description with reference to the terms "one embodiment," "some embodiments," "an example," "a specific example," or "some examples," etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s). Moreover, the specific features, structures, materials, or characteristics as described can be combined in any one or N of embodiments or examples as appropriate. In addition, different embodiments or examples and features of different embodiments or examples described in the specification may be combined by those skilled in the art without mutual contradiction.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "N" means at least two, unless otherwise specifically defined.

Any process or method described in the flowchart or otherwise depicted herein may be construed as representing modules, segments, or parts of code which include one or more executable instructions for implementing custom logic functions or processes. In addition, a scope of preferred embodiments of the present disclosure includes alternative implementations in which functions may be executed in an order different from that shown or discussed, instead in a substantially concurrently order or in a reverse order, which should be appreciated by those skilled in the art to which the embodiments of the present disclosure pertain.

The logical and/or steps described in the flowchart or otherwise depicted herein, for example, may be considered as a fixed sequence list of executable instructions for implementing logical functions, and may be specifically implemented in any computer-readable medium for use for, or in conjunction with, an instruction execution system, apparatus, or device, such as a computer-based system, a system including a processor, or other systems that may fetch and execute instructions from the instruction execution system, apparatus, or device. In terms of this disclosure, the "computer-readable medium" may be any apparatus that can include, store, communicate, propagate, or transport the program for use for or in conjunction with the instruction execution system, apparatus, or device. More specific examples (a non-exhaustive list) of the computer-readable medium include: an electrical connection portion having one or N of wires, a portable computer disk cartridge (a magnetic device), a random access memory (RAM), a read-only memory (ROM), an erasable, programmable, read-only memory (EPROM or Flash memory), an optical apparatus, and a portable compact disc read-only memory (CD-ROM). In addition, the computer-readable mediums may even be paper or other suitable mediums on which the program may be printed, since the program may be obtained electronically by, for example, optical scanning of the paper or other mediums followed by editing, interpretation or other suitable processing if necessary, and then stored in a computer memory.

It can be appreciated that each part of the present disclosure can be implemented in hardware, software, firmware or any combination thereof. In the above embodiments, N of steps or methods can be implemented using software or firmware stored in a memory and executed by a suitable instruction execution system. For example, when implemented in hardware, as in another embodiment, it can be implemented by any one or combination of the following technologies known in the art: a discrete logic circuit having logic gate circuits for implementing logic functions on data signals, an application-specific integrated circuit with suitable combined logic gates, a Programmable Gate Array (PGA), a Field Programmable Gate Array (FPGA), etc.

Those skilled in the art can appreciate that all or part of the steps carried by the method of implementing the above embodiments can be performed by instructing the relevant hardware through the program that can be stored in a computer-readable storage medium. The program, when being executed, includes one or a combination of the steps of the embodiment of the method.

In addition, in each embodiment of the present disclosure, the functional units may be integrated in one processing module, or the respective units may be separate physical existence, or two or more units may be integrated in one module. The above integrated modules can be implemented in a form of hardware, or in a form of a functional software module. When the integrated unit is implemented in the form of a software functional module and sold or used as a standalone product, it can be stored in a computer-readable storage medium.

The above-mentioned storage medium may be a read-only memory, a magnetic disk, an optical disc, or the like. Although the embodiments of the present disclosure have been shown and described above, it should be understood that the above-mentioned embodiments are exemplary and should not be construed as limiting the present disclosure. Those skilled in the art can make changes, modifications, substitutions, and alternations to the above-mentioned embodiments within the scope of the present disclosure.

What is claimed is:

1. A method for updating a programmable data plane at runtime, wherein the programmable data plane comprises distributed on-demand parsers, template-based processors, a virtual pipeline, a decoupled resource pool, and a fast update controller, and wherein the method comprises:
   splitting, based on the distributed on-demand parsers, a parsing graph into a plurality of parsing sub-graphs, and distributing each of the plurality of parsing sub-graphs to a respective one of physical stages in the virtual pipeline, wherein the parsing sub-graph at each of the physical stages is configured to instruct a local parsing process to parse out a protocol determined by a user at runtime, and at least one of a protocol adding action, a protocol deleting action, and a protocol modifying action is performed by configuring the parsing sub-graph at a target physical stage;
   adjusting, based on the template-based processors and the virtual pipeline, an order between any two of the template-based processors by configuring an interconnection network according to an instruction, wherein any one of the template-based processors functions as a physical stage of an ingress pipeline or a physical stage of an egress pipeline, and a free configuration action is performed by configuring parameters of the template-based processor;
   disaggregating and pooling, based on the decoupled resource pool, flow table resources of each of the physical stages, and creating a new flow table, recycling a flow table, or modifying a specification of a flow table at runtime; and
   suspending, based on the fast update controller, packet processing prior to a to-be-updated template-based processor among the template-based processors, and configuring or deleting the template-based processor from the virtual pipeline when the template-based processor has no packet.

2. The method according to claim 1, further comprising: setting a template-based processor among the template-based processors which is not inserted into the virtual pipeline for execution in a predetermined low-power mode.

3. The method according to claim 1, wherein each of the physical stages is a general skeleton composed of primitives that are separated from parameters, and said performing the free configuration action comprises: downloading, according to an added function when the user performs configuration, corresponding parameters into the general skeleton.

4. The method according to claim 1, further comprising, prior to said disaggregating and pooling the flow table resources of each of the physical stages: interconnecting the physical stage with disaggregating resources by using a static reconfigurable crossbar to update the template-based processor or the flow table by reconfiguring the static reconfigurable crossbar.

5. The method according to claim 2, further comprising, prior to said disaggregating and pooling the flow table resources of each of the physical stages: interconnecting the physical stage with disaggregating resources by using a static reconfigurable crossbar to update the template-based processor or the flow table by reconfiguring the static reconfigurable crossbar.

6. The method according to claim 3, further comprising, prior to said disaggregating and pooling the flow table resources of each of the physical stages: interconnecting the physical stage with disaggregating resources by using a static reconfigurable crossbar to update the template-based processor or the flow table by reconfiguring the static reconfigurable crossbar.

7. The method according to claim 1, wherein said suspending, based on the fast update controller, packet processing prior to a to-be-updated template-based processor among the template-based processors, and configuring or deleting the template-based processor from the the virtual pipeline when the template-based processor has no packet comprises:
   successively configuring template-based processors to be updated downwardly along the virtual pipeline, wherein packet processing prior to a first one of the template-based processors to be updated is suspended, the template-based processor is updated when the template-based processor has no packet, and the template-based processors to be updated are successively updated downwardly along the virtual pipeline; and
   subsequent to completion of update, deleting all empty-configured template-based processors downwardly along the virtual pipeline, wherein when deleting an empty-configured template-based processor, packet processing prior to the empty-configured template-based processor is suspended, and the empty-configured template-based processor is deleted from the virtual pipeline by configuring a reconfigurable crossbar when data in the empty-configured template-based processor is empty.

8. The method according to claim 1, wherein the programmable data plane further comprises a pipeline-by-pipeline update controller, and the method further comprises:

updating, based on the virtual pipeline-by-pipeline update controller, pipelines one by one in the data plane, wherein for any one of the virtual pipelines,
when updating the virtual pipeline, input of a packet into the virtual pipeline is suspended,
when the virtual pipeline has no packet, the virtual pipeline is updated, a packet is inputted into the virtual pipeline subsequent to completion of update, and an un-updated pipeline is selected for updating.

9. An apparatus for updating a programmable data plane at runtime, wherein the programmable data plane comprises distributed on-demand parsers, template-based processors, a virtual pipeline, a decoupled resource pool, and a fast update controller, and wherein the apparatus comprises a memory, a processor, and a computer program stored on the memory and executable on the processor, the processor being configured to execute the program to:

split, based on the distributed on-demand parsers, a parsing graph into a plurality of parsing sub-graphs, and distribute each of the plurality of parsing sub-graphs to a respective one of physical stages in the virtual pipeline, wherein the parsing sub-graph at each of the physical stages is configured to instruct a local parsing process to parse out a protocol determined by a user at runtime, and at least one of a protocol adding action, a protocol deleting action, and a protocol modifying action is performed by configuring the parsing sub-graph at a target physical stage;

adjust, based on the template-based processors and the virtual pipeline, an order between any two of the template-based processors by configuring an interconnection network according to an insertion instruction, wherein any one of the template-based processors functions as a physical stage of an ingress pipeline or a physical stage of an egress pipeline, and a free configuration action is performed by configuring parameters of the template-based processor;

disaggregate and pool, based on the decoupled resource pool, flow table resources of each of the physical stages, and create a new flow table, recycle a flow table, or modify a specification of a flow table at runtime; and suspend, based on the fast update controller, packet processing prior to a to-be-updated template-based processor among the template-based processors, and configure or delete the template-based processor from the virtual pipeline when the template-based processor has no packet.

10. The apparatus according to claim 9, wherein the processor is further configured to execute the program to: set a template-based processor among the template-based processors which is not inserted into the virtual pipeline for execution in a predetermined low-power mode.

11. The apparatus according to claim 9, wherein each of the physical stages is a general skeleton composed of primitives that are separated from parameters, and the processor is further configured to execute the program to: download, according to an added function when the user performs configuration, corresponding parameters into the general skeleton.

12. The apparatus according to claim 9, wherein the processor is further configured to execute the program to: interconnect the physical stage with disaggregating resources by using a static reconfigurable crossbar to update the template-based processor or the flow table by reconfiguring the static reconfigurable crossbar.

13. The apparatus according to claim 10, wherein the processor is further configured to execute the program to: interconnect the physical stage with disaggregating resources by using a static reconfigurable crossbar to update the template-based processor or the flow table by reconfiguring the static reconfigurable crossbar.

14. The apparatus according to claim 11, wherein the processor is further configured to execute the program to: interconnect the physical stage with disaggregating resources by using a static reconfigurable crossbar to update the template-based processor or the flow table by reconfiguring the static reconfigurable crossbar.

15. The apparatus according to claim 9, wherein the processor is further configured to execute the program to:

successively configure template-based processors to be updated downwardly along the virtual pipeline, wherein packet processing prior to a first one of the template-based processors to be updated is suspended, the template-based processor is updated when the template-based processor has no packet, and the template-based processors to be updated are successively updated downwardly along the virtual pipeline; and subsequent to completion of update, delete all empty-configured template-based processors downwardly along the virtual pipeline, wherein when deleting an empty-configured template-based processor, packet processing prior to the empty-configured template-based processor is suspended, and the empty-configured template-based processor is deleted from the virtual pipeline by configuring a reconfigurable crossbar when data in the empty-configured template-based processor is empty.

16. The apparatus according to claim 9, wherein the processor is further configured to execute the program to:

update, based on a pipeline-by-pipeline update controller, pipelines one by one in the data plane, wherein for any one of the virtual pipelines,
when updating the virtual pipeline, input of a packet into the virtual pipeline is suspended,
when the virtual pipeline has no packet, the virtual pipeline is updated, a packet is inputted into the virtual pipeline subsequent to completion of update, and an un-updated pipeline is selected for updating.

17. A non-transitory computer-readable storage medium storing a computer program, wherein the program is configured to implement, when executed by a processor, a method for updating a programmable data plane at runtime, wherein the programmable data plane comprises distributed on-demand parsers, template-based processors, a virtual pipeline, a decoupled resource pool, and a fast update controller, and wherein the method comprises:

splitting, based on the distributed on-demand parsers, a parsing graph into a plurality of parsing sub-graphs, and distributing each of the plurality of parsing sub-graphs to a respective one of physical stages in the virtual pipeline, wherein the parsing sub-graph at each of the physical stages is configured to instruct a local parsing process to parse out a protocol determined by a user at runtime, and at least one of a protocol adding action, a protocol deleting action, and a protocol modifying action is performed by configuring the parsing sub-graph at a target physical stage;

adjusting, based on the template-based processors and the virtual pipeline, an order between any two of the template-based processors by configuring an interconnection network according to an instruction, wherein any one of the template-based processors functions as a physical stage of an ingress pipeline or a physical stage of an egress pipeline, and a free configuration action is performed by configuring parameters of the template-based processor;

disaggregating and pooling, based on the decoupled resource pool, flow table resources of each of the physical stages, and creating a new flow table, recycling a flow table, or modifying a specification of a flow table at runtime; and suspending, based on the fast update controller, packet processing prior to a to-be-updated template-based processor among the template-based processors, and configuring or deleting the template-based processor from the virtual pipeline when the template-based processor has no packet.

* * * * *